United States Patent Office 2,940,839
Patented June 14, 1960

2,940,839
FUEL COMPOSITION

Philip James Garner, Hooton, England, assignor to Shell Oil Company, a corporation of Delaware No Drawing. Original application Feb. 17, 1953, Ser. No. 337,427, now Patent No. 2,839,564, dated June 17, 1958. Divided and this application Mar. 3, 1958, Ser. No. 718,467

Claims priority, application Great Britain Feb. 21, 1952

7 Claims. (Cl. 44—63)

This invention relates to normally liquid internal combustion engine fuels containing certain cyclic esters of boric acid.

The class of cyclic esters of boric acid of the present invention is represented by the formula:

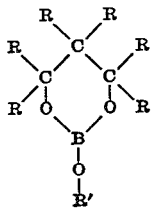

wherein each R represents the same or a different member of the group consisting of hydrogen and monovalent hydrocarbon radicals including alkyl, cycloalkyl, aryl, aralkyl and alkaryl groups, and R' represents a monovalent hydrocarbon radical including alkyl, cycloalkyl, aryl, aralkyl and alkaryl groups.

The cyclic esters of boric acid of the present invention are obtained by reacting a dihydric alcohol having the two carbinol carbon atoms linked directly by carbon-to-carbon bond to a same carbon atom, with an organo boron ester. The suitable dihydric alcohols employed as starting material in the production of the cyclic esters of boric acid of the invention may be defined as those having the two carbinol carbon atoms in a hydrocarbon chain and separated from one another by only a single carbon atom in said chain. They may be represented by the following empirical formula:

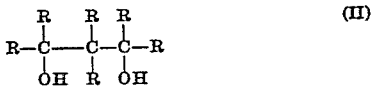

wherein each R is a member of the class consisting of hydrogen and monovalent hydrocarbon radicals including alkyl, cycloalkyl, aryl, aralkyl and alkaryl groups. Preferred diols comprise the aliphatic diols having at least 7 carbon atoms to the molecule. The suitable diols may contain up to 20 or more carbon atoms to the molecule. Cyclic esters of particular value are obtained when starting with aliphatic dihydric alcohols represented by the foregoing Formula II wherein the radicals R linked directly to the carbonyl groups are hydrocarbon radicals such as alkyl groups. Examples of dihydric alcohols which may be employed in the preparation of the cyclic boric acid esters of the present invention comprise propane-1,3-diol; butane-1,3-diol; pentane-1,3-diol; pentane-2,4-diol; 2-methylpentane-2,4-diol; 2,4-dimethylpentane-2,4-diol; 2,4-dimethylhexane-2,4-diols; 2,4-dimethyloctane-2,4-diol; their homologues and analogues.

Hydrocarbon esters of boric acid reacted with dihydric alcohols of the above-defined class to obtain the cyclic esters of boric acid of the invention comprise the class of boric acid esters obtained by substituting a monovalent hydrocarbon radical including alkyl, cycloalkyl, aryl, aralkyl and alkaryl groups, for one or more of the hydrogen atoms of boric acid. Suitable esters of boric acid employed as starting material comprise not only the triesters but also the diesters and monoesters of boric acid. Examples of such suitable acylic hydrocarbon esters of boric acid comprise: methyl borate, ethyl borate, amyl borate, diethyl borate, diamyl borate, triethyl borate, triamyl borate, triisobutyl borate, the mixed alkyl esters of boric acid, their homologues and analogues, etc.

Although mono- or diesters of boric acid may be used as starting materials in the preparation of cyclic boron esters of the invention it is preferred to employ as starting material a triester of boric acid. Preferred triesters comprise for example triethyl borate, triamyl borate; the trialkyl esters of boric acid and branched chain alcohols such as diisopropyl carbinol, methyl isobutyl carbinol; their homologues and analogues; etc.

Of the diesters and triesters of boric acid used as starting materials it is generally preferred to use those derived from an alcohol or phenol capable of being readily removed from the resulting reaction mixture as soon as it is formed, for example, by simple or azeotropic distillation.

Interaction of the diol with the hydrocarbon ester of boric acid is brought about by heating an admixture of these compounds, preferably in the presence of a suitable solvent. Suitable solvents comprise normally liquid hydrocarbons, and preferably the aromatic hydrocarbons, such as, for example, benzene, toluene, xylene and the like. The admixture obtaining the diol and the boric acid ester is heated at a temperature ranging from a moderately elevated temperature, for example, from about 50° C. to the boiling temperature of the mixture. The reaction is preferably carried out at a temperature approximating the boiling temperature of the mixture, or at the temperature at which at least a substantial part of the resulting reaction mixture is vaporized. Thus, reaction of the diol with the boric acid ester may be executed by subjecting the mixture to reflux distillation conditions.

Without intent to limit in any wise the scope of the invention by theory advanced herein to set forth more fully the nature of the invention, it is believed that the cyclic esters of boric acid are formed under the reaction conditions by a reesterification resulting in the replacement of hydrogen or alkyl groups of the starting acyclic boric acid ester by the diol, with the formation of reaction products comprising the desired cyclic esters of boric acid and normal alcohol and/or water. The nature and amounts of normal alcohol formed in addition to the cyclic ester will vary in accordance with the nature of the starting ester employed. Normal alcohols formed during the reaction will generally consist essentially of the alcohol corresponding to the hydrocarbon radical lost by the starting boric acid ester during the course of the reesterification.

In a preferred method of executing the production of the cyclic esters of boric acid, interaction of the diols and the acyclic boric acid ester is carried out in a distillation zone wherein conditions are maintained to assure the removal of any normal alcohol by-product overhead substantially as rapidly as formed. Distillation conditions are maintained until no substantial amounts of normal alcohol-containing by-products are received overhead. Thereafter the cyclic boric acid ester is separated from the distillation residue. Separation of the cyclic ester from the resulting reaction mixture may comprise one or more such steps as, for example, simple distillation, extractive distillation, azeotropic distillation, solvent extraction and the like.

The reaction generally proceeds efficiently in the absence of a catalyst. However, catalysts may be employed within the scope of the invention. Suitable catalysts comprise conventional esterification catalysts, such as, the acid catalysts, for example, sulfuric acid, para-toluene sulfonic acid, hydrogen chloride, and the like. Side reactions are minimized by continuous removal from the reaction mixture of water or alcohol substantially as rapidly as formed in the process. Inert liquid diluent may be added to the reaction mixture prior to, or during the course of the execution of the reaction.

Under the above-identified conditions the starting acyclic hydrocarbon ester of boric acid reacts with the hydrocarbon diol to form reaction products comprising the desired cyclic esters of boric acid wherein one of the three oxygen atoms linked to the boron atom is directly attached to a monovalent hydrocarbon radical, and the two remaining oxygen atoms directly linked to the boron atom are directly attached to separate carbon atoms which are in turn linked by carbon-to-carbon bonds to the same carbon atom contained in a divalent hydrocarbon radical.

By judicius selection of the diol and acyclic boric acid ester starting materials cyclic organic esters of boric acid having specifically desired composition may be obtained. The cyclic esters of boric acid of the invention having a six membered heteroatomic ring contain at least four carbon atoms. Preferred compounds are those containing at least seven carbon atoms and wherein the alkyl substituent groups attached to nuclear carbon and to the non-nuclear oxygen atom contain no more than eight carbon atoms. Compounds of particular value are those wherein at least one of the nuclear carbon atoms contained in the cyclic boric acid ester nucleus has directly attached thereto two substituent alkyl groups. Typical cyclic esters of boric acid of the invention are: ethyl 2,4-dimethylhexane-2,4-diolborate; ethyl-pentane-2,4-diol-borate; ethyl 2,4-dimethylpentane-2,4-diol-borate; ethyl-2-methylpentane-2,4-diol-borate; their homologues and analogues.

The cyclic esters of boric acid of the present invention are of value as starting or intermediate materials in the production of valuable chemical derivatives therefrom. They may be employed as additives in the production of pesticides. They been found to be of particular value because of their characteristics as additives to fuels for internal combustion engines. The presence of boron compounds in the products of combustion in an internal combustion engine is capable of minimizing octane requirement increment. The introduction of boron into the engine in effective form has, however, presented considerable difficulties. The cyclic esters of the present invention, because of valuable characteristics such as relative stability at ambient temperatures, or ability to form products which are readily soluble in the fuel to which they are added when they do undergo hydrolysis, afford an efficient means for the introduction into the engine combustion systems of desired controlled amounts of boron. The fuels, to which the cyclic esters of boric acid may be added with advantage, comprise any of the normally liquid fuels of the types used in internal combustion engines, e.g., hydrocarbon fuels such as gasoline, benzene, kerosene, gas oil; as well as alcohols and blends or mixtures thereof. The fuels to which the cyclic esters are added may comprise additional additives comprising, for example, conventional additives, such as the lead compounds utilized heretofore.

The quantity of the cyclic boric acid esters which must be added to the fuel to result in improved efficiency of operation of the internal combustion engines as evidenced by reduced octane requirement increment is usually extremely small and generally between 0.001 and 0.02% by weight of the cyclic ester of boric acid (calculated as boron) based on the weight of the fuel suffices. About 0.0025 to about 0.005% is a preferred range.

*Example I*

35 parts of 2,4-dimethylhexane-2,4-diol and 38 parts of triethyl borate are dissolved in 100 parts of benzene and the mixture distilled azeotropically until the ethyl alcohol liberation is complete, the azeotrope boiling at 68° C. The residue is then fractionally distilled at a pressure of 12 mm. mercury and the fraction boiling at 92.5 to 94.5° C. collected. This fraction amounts to 32 parts and consists predominantly of ethyl 2,4-dimethylhexane-2,4-diol borate, viz:

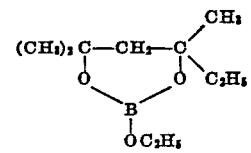

*Example II*

21 parts of pentane-2,4-diol and 32 parts of triethyl borate are dissolved in 100 parts of benzene and the mixture distilled azeotropically until the ethyl alcohol liberation is complete. The residue is then fractionally distilled and the fraction boiling at 181 to 184° C. collected. This fraction amounts to 20 parts and consists predominantly of ethyl pentane-2,4-diol borate, viz:

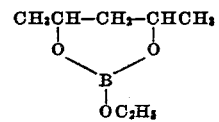

*Example III*

32 parts of 2,4-dimethylpentane-2,4-diol and 39 parts of triethyl borate are dissolved in 80 parts of benzene and the mixture distilled azeotropically until the ethyl alcohol liberation is complete. The residue is then fractionally distilled and the fraction boiling at 186 to 189° C. collected. This fraction amounts to 38 parts of ethyl 2,4-dimethylpentane-2,4-diol borate, viz:

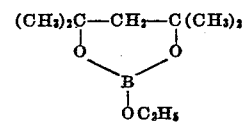

*Example IV*

59 parts of 2-methylpentane-2,4-diol and 73 parts of triethyl borate are dissolved in 160 parts of benzene and the mixture is distilled azeotropically until the ethyl alcohol liberation is complete. The residue is then fractionally distilled and the fraction boiling at 182 to 185° C. collected. This fraction amounts to 60 parts and consists of ethyl 2-methyl pentane-2,4-diol borate, viz:

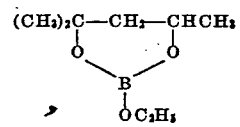

This application is a division of my copending application, Serial No. 337,427, filed February 17, 1953, now U.S. 2,839,564.

The invention claimed is:

1. A normally liquid hydrocarbon fuel for internal combustion engines consisting essentially of leaded gasoline containing from about 0.001 to about 0.02% by weight of boron in the form of a cyclic ester of boric acid having the general formula

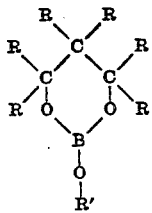

wherein R is selected from the group consisting of hydrogen and alkyl radicals, and R' is an alkyl radical.

2. A fuel composition in accordance with claim 1 wherein R' contains up to 8 carbon atoms and wherein the R's collectively contain up to 17 carbon atoms.

3. A fuel composition in accordance with claim 2 wherein the cyclic ester of boric acid is present in a concentration of from about 0.0025 to about 0.005% by weight of boron.

4. A fuel composition in accordance with claim 2, wherein the cyclic ester of a boric acid is an alkyl 2-methylpentane-2,4-diol borate.

5. A fuel composition in accordance with claim 2, wherein the cyclic ester of a boric acid is an alkyl 2,4-dimethylpentane-2,4-diol borate.

6. A fuel composition in accordance with claim 2, wherein the cyclic ester of a boric acid is an alkyl 2,4-dimethylhexane-2,4-diol borate.

7. A fuel composition in accordance with claim 4 wherein the cyclic ester of boric acid is ethyl 2-methylpentane-2,4-diol borate.

References Cited in the file of this patent

UNITED STATES PATENTS

| | | |
|---|---|---|
| 2,720,448 | Arimoto | Oct. 11, 1955 |
| 2,720,449 | Arimoto | Oct. 11, 1955 |